United States Patent [19]

Symon et al.

[11] 3,859,311

[45] Jan. 7, 1975

[54] PREPARATION OF COUMARINS

[75] Inventors: Ted Symon, Lombard; Allen K. Sparks, Des Plaines, both of Ill.

[73] Assignee: Universal Oil Products Company, Des Plaines, Ill.

[22] Filed: Feb. 25, 1972

[21] Appl. No.: 229,557

[52] U.S. Cl........... 260/343.2 R, 260/514, 260/473, 260/465, 260/488, 260/558, 260/619, 260/612, 260/613, 260/468, 260/559, 260/520, 260/476, 260/521, 260/469, 260/590, 260/591, 260/592
[51] Int. Cl............................................... C07d 7/26
[58] Field of Search................. 260/343.2 R, 465 F

[56] References Cited
UNITED STATES PATENTS

| | | | |
|---|---|---|---|
| 2,421,837 | 6/1947 | Hardman | 260/465 F |
| 2,704,766 | 3/1955 | Nordt et al. | 260/343.2 |
| 2,789,995 | 4/1957 | Johnston | 260/465 F |
| 3,282,938 | 11/1966 | Ritter et al. | 260/343.2 |
| 3,527,794 | 9/1970 | Heck | 260/476 |

*Primary Examiner*—John M. Ford
*Attorney, Agent, or Firm*—James R. Hoatson, Jr.; Raymond H. Nelson; William H. Page, II

[57] ABSTRACT

Improved selectivity of desired vinylated aromatic compounds may be obtained when aromatic compounds are treated with an ethylenic compound in the presence of certain metallic catalysts by effecting the reaction in an acidic solvent medium, the dielectric constant of said solvent being less than 6.15.

13 Claims, No Drawings

PREPARATION OF COUMARINS

This invention relates to a process for the vinylation of aromatic compounds in the presence of certain metallic compositions of matter. More specifically the invention is concerned with a process for obtaining improved yields of specific compounds by reacting an aromatic compound with an ethylenic compound in the presence of certain metallic compositions of matter and an acidic solvent medium, the dielectric constant of said solvent medium being below a certain stated figure.

Heretofore the prior art has disclosed processes for the reaction of an organometallic compound with an ethylenically unsaturated hydrocarbon in the presence of a salt of a metal selected from Group VIII of the Periodic Table. It is to be noted from this prior art that the reaction involves the aforesaid organometallic compound by reacting a salt of a Group VIII metal with a carboalkoxy, mercury, tin or lead compound prior to the reaction with the ethylenically unsaturated hydrocarbon or to optionally form this compound in situ. However, in contradistinction to this, the present invention is concerned with the reaction of an aromatic compound with a compound containing an ethylenic linkage in the presence of certain metals or salts thereof to form a vinyl substituted aromatic compound, the reaction being effected in an acidic solvent medium, the dielectric constant of said solvent being in a certain range hereinafter set forth in greater detail.

The products which are prepared according to the process of this invention and which comprise aromatic compounds containing a substituent which possesses an ethylenic linkage therein are useful in the chemical industry and particularly the aroma industry. The compounds thus prepared are useful as intermediates in the preparation of aroma chemicals. For example, methyl cinnamate, which possesses a balsamic odor, may be prepared according to this process. The compound beta-styrylacetate may be hydrogenated to form particularly beta-phenylethyl acetate and thereafter hydrolyzed to form beta-phenylethanol which possesses an aroma of attar of rose. Another compound which may be formed from the hydrolysis of beta-styrylacetate is phenylacetaldehyde, this compound adding hyacinth, jonquil, or narcissus notes to aroma chemicals. Yet another compound which may be prepared according to the process of this invention is 2-(2-hydroxyphenyl)acrylic acid which may be converted to coumarin which possesses a fragrant odor similar to vanilla and which is used as a deodorizing and odor enhancing agent in perfumes, soaps, tobacco, inks, rubber, and other products where aromatic ingredients are required. The aforementioned products are useful in the preparation of fragrances or aroma compositions which are added to cosmetic and toiletry articles such as perfumes, colognes, soaps, talcs, bath powders, etc. whereby the aforementioned compounds will possess desirable and pleasing scents.

It is therefore an object of this invention to provide a novel process for preparing substituted aromatic compounds in which the substituent possesses an ethylenic linkage.

A further object of this invention is to provide a process for obtaining improved yields of certain specific isomers of certain specific compounds by effecting the direct reaction of an ethylenic compound with an aromatic compound in the presence of certain metals or salts thereof in an acidic solvent medium which possesses a dielectric constant within a specified range.

In one aspect an embodiment of this invention resides in a process for the vinylation of an aromatic compound possessing the generic formula:

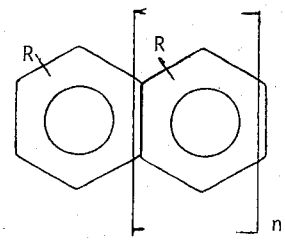

in which R is selected from the group consisting of hydrogen, hydroxyl, alkyl, alkoxyl, aryl, alkaryl, cycloalkyl and halogen radicals and $n$ ranges from 0 to 2, which comprises reacting said aromatic compound with an ethylenic compound possessing the formula:

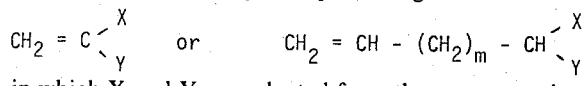

in which X and Y are selected from the group consisting of hydrogen,

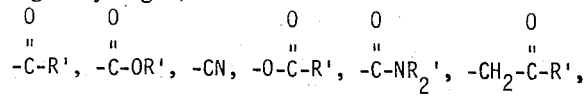

and OR′ radicals, R′ being independently selected from the group consisting of hydrogen, alkyl, aryl, cycloalkyl, aralkyl and alkaryl radicals and $m$ ranges from 0 to 16 in the presence of a catalyst selected from (a) an organic salt of a metal of Group VIII of the Periodic Table, (b) a system consisting of a metal of Group VIII of the Periodic Table or an organic salt thereof and a transition series metal or organic salt thereof, at least one component of said system being in the form of an organic salt, or (c) a system consisting essentially of a metal of Group VIII of the Periodic Table, a transition series metal and an oxygen-containing gas, said process being effected in an acidic solvent medium, the dielectric constant of said solvent being less than 6.15 and recovering the resultant vinylated aromatic compound.

A specific embodiment of this invention is found in a process for the vinylation of phenol by treating said phenol with methyl acrylate in the presence of a catalyst comprising palladium acetate, cupric acetate, and air in an acidic solvent medium comprising propionic acid, and recovering the resultant coumarin.

Other objects and embodiments will be found in the following further detailed description of the present invention.

As hereinbefore set forth the present invention is concerned with a process for the vinylation of aromatic compounds which comprises treating an aromatic compound with a compound containing an ethylenic linkage, the process being catalyzed by the use of certain catalyst systems hereinafter set forth in greater detail. In addition to utilizing these certain catalyst systems the reaction is effected in the presence of an acidic solvent medium. In this respect, it has now been discovered that by utilizing certain solvents which possess a relatively low dielectric constant, it is possible to obtain a selective vinylation of the aromatic compound to form desired products. This is especially true when the desired product comprises a compound such as coumarin, which, as hereinbefore set forth, it utilized in the aroma industry. For example, phenol may be subjected to a vinylation process by treating said phenol with methyl acrylate in the presence of a catalyst system comprising cupric acetate, palladium acetate and air in an acidic solvent medium. The resultant products from this reaction will comprise coumarin, methyl o-coumarate and methyl p-coumarate. Of these products, coumarin and methyl o-coumarate constituted the desired compounds inasmuch as methyl o-coumarate is easily converted to the desired coumarin in either a thermal or catalytic process. Conversely, methyl p-coumarate constitutes an unwanted product inasmuch as it cannot be converted to coumarin and thus represents a loss of the starting material. In order to make the process more attractive in a commercial way and thus render said process economically feasible to operate, it is necessary to effect said reaction in such a manner so as to direct the process toward the selective vinylation of the phenol to form a predominant amount of coumarin and the o-vinylated product.

In this respect, it has now been discovered that by utilizing certain acidic solvent media in which the dielectric constant of the media lies below a certain number, it is possible to obtain a significant increase in the ratio of ortho-substituted products to para-substituted products as well as an increase in the selectivity of the desired product such as coumarin. This increase in selectivity will be hereinafter shown in greater detail.

Examples of organic compounds which may be reacted in the process will possess the generic formula:

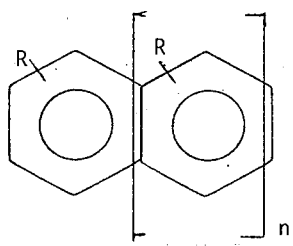

in which R is selected from the group consisting of hydrogen, hydroxyl, alkyl, alkoxyl, aryl, alkaryl, aralkyl, cycloalkyl and halogen (preferably chlorine) radicals and n is an integer of from 0 to about 2. Specific examples of these compounds will include benzene, phenol, toluene, ethylbenzene, n-propylbenzene, isopropylbenzene (cumene), n-butylbenzene, sec-butylbenzene, t-butylbenzene, n-amylbenzene, sec-amylbenzene, etc., anisole, phenetole, propylphenylether, isopropylphenylether, butylphenylether, etc., phenylbenzene, benzylbenzene, o-tolylbenzene, m-tolylbenzene, p-tolylbenzene, cyclohexylbenzene, cyclopentylbenzene, chlorobenzene, 1-methylnaphthalene, 2-methylnaphthalene, 1,6-dimethylnaphthalene, 1,8-dimethylnaphthalene, 1-ethylnaphthalene, 2-ethylnaphthalene, 1,2-diethylnaphthalene, 1-methoxynaphthalene, 2-methoxynaphthalene, 1,6-methoxynaphthalene, 1,8-methoxynaphthalene, 1-ethoxynaphthalene, 2,-ethoxynaphthalene, 1-phenylnaphthalene, 2-phenylnaphthalene, 1-benzylnaphthalene, 1-p-tolylnaphthalene, 2-p-tolylnaphthalene, 1-o-tolylnaphthalene, 1-m-tolylnaphthalene, 1-benzylnaphthalene, 2-benzylnaphthalene, 1-cyclopentylnaphthalene, 2-cyclohexylnaphthalene, 1-chloronaphthalene, 2-chloronaphthalene, 1,6-dichloronaphthalene, the corresponding anthracenes, etc.

The aforementioned aromatic compounds are reacted with an ethylenic compound which possesses the generic formula:

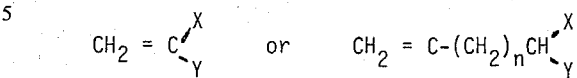

in which X and Y are selected from the group consisting of hydrogen,

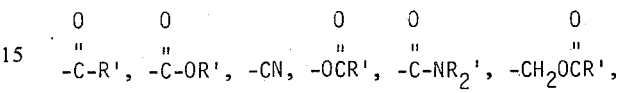

and OR' radicals, R' being selected from the group consisting of hydrogen, alkyl, aryl, cycloalkyl, aralkyl, alkaryl radicals and n is an integer of from 0 to about 16. Some specific examples of these compounds which contain an ethylenic linkage will include methyl vinyl ketone, ethyl vinyl ketone, propyl vinyl ketone, butyl vinyl ketone, methyl propenyl ketone, ethyl propenyl ketone, propyl propenyl ketone, phenyl vinyl ketone, phenyl propenyl ketone, cyclopentyl vinyl ketone, cyclohexyl vinyl ketone, cyclopentyl propenyl ketone, cyclohexyl propenyl ketone, benzyl vinyl ketone, benzyl propenyl ketone, o-tolyl vinyl ketone, m-tolyl vinyl ketone, p-tolyl vinyl ketone, o-tolyl propenyl ketone, m-tolyl propenyl ketone, p-tolyl propenyl ketone, acrolein, acrylic acid, allyl acetate, isobutenyl acetate, isobutenylpropionate, methallyl acetate, methyl acrylate, ethyl acrylate, propyl acrylate, isopropyl acrylate, phenyl acrylate, benzyl acrylate, cyclopentyl acrylate, cyclohexyl acrylate, o-tolyl acrylate, m-tolyl acrylate, p-tolyl acrylate, methyl methacrylate, ethyl methacrylate, propyl methacrylate, isopropyl methacrylate, phenyl methacrylate, benzyl methacrylate, cyclopentyl methacrylate, cyclohexyl methacrylate, o-tolyl methacrylate, m-tolyl methacrylate, p-tolyl methacrylate, acrylonitrile, vinyl acetate, vinyl propionate, vinyl benzoate, vinyl cyclohexane carboxylic acid, acrylamide, N-methylacrylamide, N-ethylacrylamide, N-propylacrylamide, N-isopropylacrylamide, N-phenylacrylamide, N-benzylacrylamide, N-o-tolylacrylamide, N-p-tolylacrylamide, N-cyclopentylacrylamide, N-cyclohexylacrylamide, N,N-dimethylacrylamide, N,N-diethylacrylamide, N,N-dipropylacrylamide, N,N-diisopropylacrylamide, N,N-diphenylacrylamide, N,N-dibenzylacrylamide, N,N-di-o-tolylacrylamide, N,N-di-m-tolylacrylamide, N,N-di-p-tolylacrylamide, N,N-dicyclohexylacrylamide, N,N-dicyclopentylacrylamide, etc. It is to be understood that the aforementioned aromatic compounds and compounds containing an ethylenic linkage are only representative of the class of compounds which may be utilized as starting materials, and that the present invention is not necessarily limited thereto.

The reaction between the aromatic compound and the ethylenic compound of the type hereinbefore set forth in greater detail is effected in the presence of a catalyst which is selected from (a) an organic salt of a metal of Group VIII of the Periodic Table, (b) a system consisting of a metal of Group VIII of the Periodic Table or an organic salt thereof and a transition series metal or organic salt thereof, at least one component of said system being in the form of an organic salt or (c) a system consisting essentially of a metal of Group VIII of the Periodic Table, a transition series metal and an oxygen-containing gas. In the preferred embodiment of the invention, the organic salts of the Group VIII metal or transition series metal will comprise carboxylates or acetylacetonates of the metals. Specific examples of these Group VIII metal salts will include the carboxylates such as palladium acetate, palladium propionate, palladium butyrate, palladium valerate, palladium caproate, platinum acetate, platinum propionate, platinum butyrate, platinum valerate, platinum caproate, rhodium acetate, rhodium propionate, rhodium butyrate, rhodium valerate, rhodium caproate, ruthenium acetate, ruthenium propionate, ruthenium butyrate, ruthenium valerate, ruthenium caproate, osmium acetate, osmium propionate, osmium butyrate, osmium valerate, osmium caproate, iridium acetate, iridium propionate, iridium butyrate, iridium valerate, iridium caproate, nickel acetate, nickel propionate, nickel butyrate, nickel valerate, nickel caproate, palladium acetylacetonate, platinum acetylacetonate, rhodium acetylacetonate, ruthenium acetylacetonate, osmium acetylacetonate, iridium acetylacetonate, and nickel acetylacetonate, etc. The second catalyst system which may be employed as an alternative consists of a metal of Group VIII of the Periodic Table or an organic salt thereof and a transition series metal or organic salt thereof, at least one component of said system being in the form of an organic salt. The metals of Group VIII of the Periodic Table which may be employed include, in particular, the noble metals of Group VIII such as platinum, palladium, rhodium, ruthenium, osmium, and iridium. The transition series metal will be selected from the group consisting of copper, cobalt, nickel, iron manganese, chromium, vanadium, titanium, antimony and silver. Specific examples of the salts of the transition series metal which may be employed will also include the carboxylates and acetylacetonates such as copper acetate, copper propionate, copper butyrate, copper valerate, copper acetylacetonate, cobalt acetate, cobalt propionate, cobalt butyrate, cobalt valerate, cobalt acetylacetonate, nickel acetate, nickel propionate, nickel butyrate, nickel valerate, nickel acetylacetonate, iron acetate, iron propionate, iron butyrate, iron valerate, iron acetylacetonate, manganese acetate, manganese propionate, manganese butyrate, manganese valerate, manganese acetylacetonate, chromium acetate, chromium propionate, chromium butyrate, chromium valerate, chromium acetylacetonate, vanadium acetate, vanadium propionate, vanadium butyrate, vanadium valerate, vanadium acetylacetonate, titanium acetate, titanium propionate, titanium butyrate, titanium valerate, titanium acetylacetonate, antimony acetate, antimony propionate, antimony butyrate, antimony valerate, antimony acetylacetonate, silver acetate, silver propionate, silver butyrate, silver valerate, silver acetylacetonate, etc. In addition, if so desired, when the reaction is effected in the presence of the aforesaid catalyst system, it is also contemplated that an oxygen-containing gas may be present. This oxygen-containing gas may consist of oxygen or air, the latter being preferred due to the greater availability and lower cost thereof.

In yet another embodiment the reaction of the present invention may be effected in the presence of a catalyst system comprising a Group VIII metal, a transition series metal, and an oxygen-containing gas such as oxygen or air, where the oxygen is present in elemental form, said catalysts systems include, for example, a mixture of platinum and copper, palladium and copper, palladium and nickel, palladium and iron, platinum and iron, etc.

In addition to effecting the vinylation reaction in the presence of a catalyst of the type hereinbefore set forth, the reaction is also effected in the presence of an acidic solvent which constitutes the reaction medium for the vinylation of an aromatic compound with a compound containing an ethylenic linkage. The solvent system, which is acidic in nature, may consist of an organic acid having a dielectric constant (E) less than that of acetic acid (dielectric constant E=6.15) or a combination of an organic acid and a co-solvent of equal or lower dielectric constant. Some examples of these acidic solvents which may be used may be selected from the following list:

| ACID | DIELECTRIC CONSTANT (E) |
| --- | --- |
| Propionic Acid | 3.30 |
| Butyric Acid | 2.97 |
| Valeric Acid | 2.60 |
| Isobutyric Acid | 2.71 |
| Isovaleric Acid | 2.60 |

In addition, it is also contemplated that other acids such as caproic acid, oenanthylic acid, caprylic acid, pelargonic acid and capric acid which also possess low dielectric constants may also be used.

Examples of other organic solvents which possess low dielectric constants and which may be used as a co-solvent with one of the organic acids hereinbefore set forth will include:

| SOLVENT | DIELECTRIC CONSTANT (E) |
| --- | --- |
| n-pentane | 1.84 |
| n-hexane | 1.89 |
| n-heptane | 1.92 |
| n-octane | 1.95 |
| n-nonane | 1.97 |
| n-decane | 1.99 |
| cyclopentane | 1.96 |
| cyclohexane | 2.02 |
| methylcyclopentane | 1.98 |
| methylcyclohexane | 2.02 |
| benzene | 2.28 |
| pseudocumene | 2.42 |
| mesitylene | 2.27 |

It is also contemplated within the scope of this invention that other polyalkyl substituted benzenes which possess relatively low dielectric constants such as prehnitol, isodurene, durene, etc., may also be used although not necessarily with equivalent results.

While the above discussion has centered on the use of acids other than acetic acid as a solvent medium for the vinylation reaction of the present invention, it is also possible to utilize acetic acid as one component of the solvent system as long as another component of the solvent system has a dielectric constant less than that of acetic acid, i.e., 6.15, so that the dielectric constant of the combined components will be less than 6.15. For example, acetic acid may be combined with cyclohexane which possesses a dielectric constant of E=2.02, the dielectric constant of the acetic acid-cyclohexane solvent system then being less than 6.15, the dielectric constant of acetic acid alone. It is to be understood that the aforementioned organic acids and organic solvents are only representative of the class of compounds which may be used and that any organic solvent having a dielectric constant less than about 6.15 may be utilized in the process of this invention.

The reaction conditions under which the process of this invention is effected will include temperatures ranging from ambient (about 20°–25°C.) up to about 250°C. or more. In addition the reaction pressures at which the aromatic compound is reacted with the ethylenic compound will range from about atmospheric to about 500 atmospheres or more, the superatmospheric pressure usually being supplied by the introduction of the oxygen-containing gas into the reaction vessel. However, it is also contemplated within the scope of this invention that the oxygen-containing gas may afford only a partial pressure of the total desired reaction pressure, the remainder of the said pressure being provided for by the introduction of a substantially inert gas such as nitrogen into the reaction zone.

The process of this invention may be effected in any suitable manner and may comprise either a batch or continuous type operation. For example, when a batch type operation is used, a quantity of the aromatic compound and the compound containing an ethylenic linkage are placed in an appropriate apparatus along with a particular catalyst system previously decided upon. In addition, the acidic solvent medium such as an organic acid, or a solvent system comprising an organic acid and a co-solvent which possesses an equal or lower dielectric constant is also placed in the apparatus. This apparatus may, in the preferred embodiment of the invention, comprise an autoclave of the rotating or mixing type. The autoclave is sealed and if the reaction is to be effected in the presence of an oxygen-containing gas, the gas is charged thereto. Thereafter the apparatus is heated to the desired operating temperature and maintained at the desired conditions of temperature and pressure for a predetermined residence time which may range from about 0.5 up to about 48 hours or more in duration. At the end of this period, heating is discontinued and the apparatus and contents thereof are allowed to return to room temperature. Thereafter any excess pressure, if any, is discharged and the autoclave is opened. The reaction mixture is recovered therefrom and is then subjected to conventional means of separation and purification such as filtration to separate any solid catalyst, followed by washing with water, drying over sodium sulfate, evaporation, fractional crystallization, fractional distillation, etc., whereby the desired product comprising a vinylated aromatic compound is recovered along with any specific isomer.

It is also contemplated within the scope of this invention that the process of this invention may be effected in a continuous manner of operation. When such a type of operation is used, a quantity of the aromatic compound and the ethylenic compound are continuously charged to a reactor which contains the particular catalyst system to be employed and which is maintained at the desired operating conditions of temperature and pressure. In addition, the organic acidic solvent or co-solvent system possessing a dielectric constant less than about 6.15 is also continuously charged to the reactor through a separate line. If so desired, one or both of the reactants may be admixed with the solvent system prior to entry into said reactor and the mixture charged thereto in a single stream. Upon completion of the desired residence time, the reactor effluent is continuously withdrawn from the reactor and subjected to separation processes. In these separation processes the desired product comprising a vinyl substituted aromatic compound and any specific isomers is separated from unreacted aromatic compound, unreacted ethylenic compound, solvent and unwanted isomers. The unreacted starting material and solvent may be recycled to form a portion of the feed stock. When utilizing a solid catalyst system, it is possible to effect the continuous manner of operation in various ways. One such method is to utilize the catalyst as a fixed bed in the reactor and pass the reactants and solvent system through said catalyst bed in either an upward or downward flow. Another method of effecting the reaction is to utilize the catalyst in a moving bed type of operation whereby the reactants in the acidic solvent medium and the catalyst are passed through the reaction zone either concurrently or countercurrently to each other. Yet another method is the slurry type of operation in which the catalyst is passed into the reaction zone as a slurry in one or both of the reactants.

Examples of aromatic compounds containing a vinyl substituent which may be prepared according to the process of this invention will include coumarin, 2-phenylvinyl acetate, 2-phenylvinyl propionate, 2-phenylvinyl butyrate, 2-phenylvinyl valerate, 2-(2-hydroxyphenyl)vinyl acetate, 2-(2-methoxyphenyl)vinyl acetate, 1-methyl-2-phenylacrylic acid methyl ester, 1-methyl-2-(2-hydroxyphenyl)-acrylic acid methyl ester, 1-methyl-2-(2-methoxyphenyl)acrylic acid methyl ester, 2-(phenyl)acrylic acid, 2-(2-hydroxyphenyl)acrylic acid, 2-(2-methoxyphenyl)acrylic acid, 2-(2-chlorophenyl)acrylic acid, 2-(2-bromophenyl)acrylic acid, etc. It is to be understood that the aforementioned compounds are merely representative of the class of compounds which may be prepared according to the process described herein and that the present invention is not necessarily limited thereto.

The following examples are given to illustrate the process of the present invention which, however, are not intended to limit the generally broad scope of the present invention in strict accordance therewith.

EXAMPLE I

A mixture of 282 g. (3.0 mole) of phenol, 103.3 g. (1.2 mole) of methyl acrylate along with 6 mmoles of palladium acetate and 12 mmoles of cupric acetate, 128 g. of acetic acid and 6 g. of a finely divided diatomaceous earth was placed in a 1-liter stirred, stainless steel autoclave. The autoclave was sealed, pressured to 250 pounds per square inch with air, heated to a temperature of 90° C. and maintained at this temperature and pressure for a period of 6 hours while air was admitted to the autoclave at a rate of 1 standard cubic foot per hour. At the end of the 6-hour period, the air was replaced with nitrogen over a period of 1 hour while maintaining the autoclave at 90° C. to cause the precipitation of the palladium metal. The excess pressure was then discharged and the autoclave was opened. After separation of the reaction mixture from the catalyst, the mixture was then analyzed by means of gas-liquid chromatography. This analysis determined that the selectivity of the reaction to coumarin and methyl ortho-coumarate was 38 percent, the ratio of ortho- to para-compounds being 1.7:1.

EXAMPLE II

The experiment performed in Example I above was repeated utilizing the same amounts of phenol, methyl acrylate, palladium acetate and cupric acetate. However, the acidic solvent medium which was utilized in the first example, that is, acetic acid having a dielectric constant E=6.15 was replaced by 130 g. of a solvent comprising 65 g. of propionic acid (dielectric constant E=3.30) and 65 g. of cyclohexane (dielectric constant E=2.02). The autoclave was sealed, pressured to 250 pounds per square inch with air, heated to a temperature of 90° C. and air pressed in at a rate of 1 standard cubic foot per hour. The autoclave was maintained at 90° C. for a period of 6 hours following which the air was replaced with nitrogen for an additional 1-hour period. At the end of this time, heating was discontinued, the autoclave was allowed to return to room temperature and the excess pressure was discharged. The autoclave was then opened and the reaction mixture separated from the catalyst. Analysis of the reaction mixture by means of gas-liquid chromatography disclosed that there had been a selective conversion to coumarin and methyl o-coumarate of 51 percent with a ratio of methyl o-coumarate to methyl p-coumarate of 2.4:1.

It is therefore readily apparent from a comparison of the above examples that by utilizing an acidic solvent medium having a relatively low dielectric constant it is possible to obtain a greater selectivity to the desired products, which in this instance, comprise coumarin and methyl o-coumarate with a correspondingly high ratio of ortho- to paravinylated products than was obtained when utilizing an acidic solvent medium such as acetic acid which has a dielectric constant of 6.15.

An additional experiment in which the solvent medium comprised 128 g. of propionic acid having a dielectric constant E=3.30, the remainder of the conditions and reactants being identical to those used in Example I above, also resulted in an increased selectivity over that which was obtained when using acetic acid as the solvent medium. The use of propionic acid having a lower dielectric constant resulted in a 46 percent selectivity to coumarin and methyl o-coumarate as compared to 38 percent when using acetic acid as well as a ratio of ortho- to paravinylated products of 2.4:1 as compared to the 1.7:1 ratio found in Example I above.

EXAMPLE III

In this example a mixture comprising 108 g. (1.0 mole) of o-cresol, 25.8g. (0.3 mole) of methyl acrylate, 6 mmoles of palladium acetylacetonate and 12 mmoles of cupric acetylacetonate along with 130 g. of an acidic solvent medium comprising a 1:1 mixture of propionic acid (dielectric constant E=3.30) and mesitylene (dielectric constant E=2.27) and 2 g. of a diatomaceous earth is placed in an autoclave. The autoclave is sealed, air is pressed in to an initial operating pressure of 250 pounds per square inch, and heated to a temperature of 90° C. The autoclave is maintained at this temperature of 90° C. for a period of 6 hours while the flow of air is maintained at a rate of 1 standard cubic foot per hour. At the end of the 6-hour period, the charge of air to the autoclave is discontinued and replaced by nitrogen in order to precipitate the palladium catalyst. Thereafter the autoclave is allowed to return to room temperature, the excess pressure is discharged and the autoclave is opened. The reaction mixture is separated from the catalyst and subjected to gas-liquid chromatographic analysis. This analysis will disclose that there has been a high selectivity to the formation of 8-methylcoumarin.

EXAMPLE IV

In a manner similar to that set forth in the above examples, a mixture comprising 52 g. (0.67 mole) of benzene, 10 g. (0.1 mole) of allyl acetate along with 2 mmoles of palladium acetylacetonate and 2 mmoles of copper acetate is placed in a rotating autoclave. In addition, 130 g. of propionic acid (dielectric constant E=3.30) and n-pentane (dielectric constant E=1.84) is also placed in the autoclave. The autoclave is sealed, pressured to 250 psig with air, heated to a temperature of 90° C. and maintained thereat for a period of 6 hours while air is charged thereto at a rate of 1 standard cubic foot per hour. At the end of the 6-hour period, the introduction of air to the autoclave is discontinued and replaced by a stream of nitrogen for an additional period of 1 hour. Thereafter heating is discontinued, the autoclave is allowed to return to room temperature and the excess pressure is discharged. The reaction mixture is recovered, separated from the catalyst and subjected to gas-liquid chromatographic analysis. This analysis will disclose a high selectivity in the formation of the desired product comprising cinnamyl acetate.

EXAMPLE V

In like manner a mixture comprising 0.5 mole of benzene, 0.2 mole of vinyl acetate, 2 mmoles of palladium propionate and 1 mmole of copper acetate is placed in an autoclave along with an acidic solvent medium comprising a mixture of propionic acid and cyclohexane. The autoclave is sealed and air is pressed in until an initial pressure of 250 pounds per square inch is reached. The autoclave is heated to a temperature of 90° C. and maintained thereat for a period of 6 hours. At the end of the 6-hour period, the introduction of air into the reactor is replaced by the introduction of nitrogen thereto for an additional period of 1 hour. Thereafter heating is discontinued, the autoclave is allowed to return to room temperature and the autoclave is opened. The reaction mixture is recovered, separated from the catalyst by means of filtration after which the filtrate is washed with water, dried over sodium sulfate and the solvent medium is removed by distillation. Analysis of the remaining product will disclose the presence of the desired 2-phenylvinyl acetate in a relatively high degree of selectivity.

EXAMPLE VI

A mixture comprising 282 g. (3.0 mole) of phenol, 103.3 g. (1.2 moles) of methyl acrylate, 6 mmoles of platinum acetylacetonate, and 12 mmoles of copper acetate along with 130 g. of an acidic solvent medium comprising a mixture of acetic acid (E=6.15) and cyclohexane (E=2.02) was placed in an autoclave and subjected to reaction in a manner similar to that set forth above, that is by pressing air into the autoclave at a rate of 1 standard cubic foot per hour for a period of 6 hours and heating the autoclave to a temperature of 90° C. At the end of the 6-hour period, the reaction mixture was recovered in a manner similar to that set forth in the above examples and subjected to gas-liquid chromatographic analysis whereby a high degree of selectivity to coumarin and methyl o-coumarate of 42 percent and a ratio of methyl o-coumarate to methyl p-coumarate was established.

We claim as our invention:

1. A process for the preparation of a coumarin which comprises reaction of a phenol with acrylic acid or an acrylate in the presence of a catalyst selected from (a) an organic salt of a metal of Group VIII of the Periodic Table, (b) a system consisting of a metal of Group VIII of the Periodic Table or an organic salt thereof and a transition series metal or organic salt thereof, at least one component of said system being in the form of an organic salt, or (c) a system consisting essentially of a metal of Group VIII of the Periodic Table, a transition series metal and an oxygen-containing gas, said process being effected in an acidic solvent medium, the dielectric constant of said solvent being less than 6.15 and recovering said coumarin.

2. The process as set forth in claim 1 in which benzophenol is reacted with methylacrylate and coumarin is recovered from a product mixure of coumarin, methyl-O-coumarate and methyl p-coumarate.

3. The process of claim 1 in which o-cresol is reacted with methylacrylate and beta-methylcoumarin is recovered.

4. The process as set forth in claim 1 in which said organic salt is a carboxylate or acetylacetonate.

5. The process as set forth in claim 1 in which said organic salt of a metal of Group VIII of the Periodic Table is palladium acetate.

6. The process as set forth in claim 1 in which said organic salt of a metal of Group VIII of the Periodic Table is palladium acetylacetonate.

7. The process as set forth in claim 1 in which said organic salt of a metal of Group VIII of the Periodic Table is palladium propionate.

8. The process as set forth in claim 1 in which said organic salt of a metal of Group VIII of the Periodic Table is platinum acetylacetonate.

9. The process as set forth in claim 1 in which said metal of Group VIII of the Periodic Table is palladium.

10. The process as set forth in claim 1 in which said acidic solvent is propionic acid.

11. The process as set forth in claim 1 in which said acidic solvent is a mixture of propionic acid and mesitylene.

12. The process as set forth in claim 1 in which said acidic solvent is a mixture of propionic acid and cyclohexane.

13. The process as set forth in claim 1 in which said acidic solvent is a mixture of propionic acid and benzene.

* * * * *

UNITED STATES PATENT OFFICE
CERTIFICATE OF CORRECTION

PATENT NO. : 3,859,311
DATED : January 7, 1975
INVENTOR(S) : Ted Symon et al

It is certified that error appears in the above-identified patent and that said Letters Patent are hereby corrected as shown below:

In claim 2, line 1, cancel "benzo-".

In claim 3, line 2, change "beta" to -- 8 --.

Signed and sealed this 17th day of June 1975.

(SEAL)
Attest:

RUTH C. MASON
Attesting Officer

C. MARSHALL DANN
Commissioner of Patents
and Trademarks